United States Patent
Yu et al.

(10) Patent No.: US 12,360,267 B2
(45) Date of Patent: Jul. 15, 2025

(54) INTELLIGENT GEOPHYSICAL DATA ACQUISITION SYSTEM AND ACQUISITION METHOD FOR SHALE OIL AND GAS OPTICAL FIBER

(71) Applicants: BGP INC., CHINA NATIONAL PETROLEUM CORPORATION, Baoding (CN); OPTICAL SCIENCE AND TECHNOLOGY (CHENGDU) LTD, Chengdu (CN)

(72) Inventors: Gang Yu, Baoding (CN); Xing Liang, Baoding (CN); Liang Gou, Baoding (CN); Yunjiang Rao, Baoding (CN); Ximing Wang, Baoding (CN); Shujun Xia, Baoding (CN); Shujie An, Baoding (CN); Junjun Wu, Baoding (CN); Yuanzhong Chen, Baoding (CN); Zengling Ran, Baoding (CN); Renzhi Zhang, Baoding (CN)

(73) Assignees: BGP INC., CHINA NATIONAL PETROLEUM CORPORATION, Baoding (CN); OPTICAL SCIENCE AND TECHNOLOGY (CHENGDU) LTD, Chengdu (CN)

( * ) Notice: Subject to any disclaimer, the term of this patent is extended or adjusted under 35 U.S.C. 154(b) by 375 days.

(21) Appl. No.: 18/119,829

(22) Filed: Mar. 10, 2023

(65) Prior Publication Data
US 2023/0213669 A1 Jul. 6, 2023

Related U.S. Application Data

(63) Continuation of application No. PCT/CN2021/141024, filed on Dec. 24, 2021.

(30) Foreign Application Priority Data

Aug. 2, 2021 (CN) .......................... 202110879066.2

(51) Int. Cl.
*E21B 47/09* (2012.01)
*E21B 17/02* (2006.01)
(Continued)

(52) U.S. Cl.
CPC ............ *G01V 1/226* (2013.01); *E21B 17/026* (2013.01); *E21B 43/116* (2013.01);
(Continued)

(58) Field of Classification Search
CPC . G01V 1/226; G01V 1/42; G01V 1/50; G01V 2210/1234; G01V 2210/622;
(Continued)

(56) References Cited

U.S. PATENT DOCUMENTS

2012/0257475 A1 10/2012 Luscombe et al.
2017/0269249 A1* 9/2017 Perez .................... G01V 1/164
(Continued)

FOREIGN PATENT DOCUMENTS

| CN | 105277971 A | 1/2016 |
| CN | 106646617 A | 5/2017 |

(Continued)

*Primary Examiner* — Krystine E Breier
(74) *Attorney, Agent, or Firm* — Zhigang Ma (57) ABSTRACT

The present invention provides an intelligent geophysical data acquisition system and acquisition method for shale oil and gas optical fiber. A pipe string is arranged in a metal casing, and an external armored optical cable is fixed outside the metal casing; an, internal armored optical cable is fixed outside the pipe string; the external armored optical cable comprises a downhole acoustic sensing optical cable, two multi-mode optical fibers, a strain optical cable and a pressure sensor array, and further comprises horizontal ground acoustic sensing optical cables arranged in the shallow part of the ground according to an orthogonal grid, and artificial seismic source excitation points arranged on the ground according to the orthogonal grid.

9 Claims, 6 Drawing Sheets

(51) Int. Cl.
*E21B 43/116* (2006.01)
*E21B 43/119* (2006.01)
*E21B 43/26* (2006.01)
*E21B 47/007* (2012.01)
*E21B 47/07* (2012.01)
*E21B 47/107* (2012.01)
*E21B 47/12* (2012.01)
*E21B 49/00* (2006.01)
*G01D 5/353* (2006.01)
*G01V 1/22* (2006.01)
*G01V 1/42* (2006.01)
*G01V 1/50* (2006.01)
*E21B 33/14* (2006.01)

(52) U.S. Cl.
CPC ............ *E21B 43/119* (2013.01); *E21B 43/26* (2013.01); *E21B 47/007* (2020.05); *E21B 47/07* (2020.05); *E21B 47/09* (2013.01); *E21B 47/107* (2020.05); *E21B 47/12* (2013.01); *E21B 49/00* (2013.01); *G01D 5/35361* (2013.01); *G01V 1/42* (2013.01); *G01V 1/50* (2013.01); *E21B 33/14* (2013.01); *G01V 2210/1234* (2013.01); *G01V 2210/622* (2013.01)

(58) Field of Classification Search
CPC ...... E21B 47/007; E21B 47/107; E21B 47/07; E21B 47/09; E21B 47/12; E21B 17/026; E21B 43/116; E21B 43/119; E21B 43/26; E21B 49/00; E21B 33/14; G01D 5/35361
See application file for complete search history.

(56) References Cited

U.S. PATENT DOCUMENTS

| | | | | |
|---|---|---|---|---|
| 2020/0102821 | A1* | 4/2020 | Willis | G01V 1/37 |
| 2020/0131900 | A1* | 4/2020 | Leblanc | G01V 8/16 |
| 2020/0319417 | A1* | 10/2020 | Kamath | E21B 47/135 |
| 2022/0412821 | A1* | 12/2022 | Jaaskelainen | E21B 47/135 |

FOREIGN PATENT DOCUMENTS

| | | |
|---|---|---|
| CN | 111536892 A | 8/2020 |
| CN | 111665568 A | 9/2020 |
| CN | 112268642 Y | 1/2021 |
| CN | 112593924 Y | 4/2021 |
| CN | 113484912 | 10/2021 |

* cited by examiner

INTELLIGENT GEOPHYSICAL DATA ACQUISITION SYSTEM AND ACQUISITION METHOD FOR SHALE OIL AND GAS OPTICAL FIBER

TECHNICAL FIELD

The present invention belongs to the technical field of geophysical exploration, and exploration and development of shale oil and gas resources, and particularly relates to an intelligent geophysical data acquisition system and acquisition method for shale oil and gas optical fiber.

BACKGROUND

The optical fiber sensing technology began in 1977 and developed rapidly with the development of the optical fiber communication technology. The optical fiber sensing technology is an important symbol to measure the informatization degree of a country. The optical fiber sensing technology has been widely used in the fields of military affairs, national defense, aerospace, industrial and mining enterprises, energy and environmental protection, industrial control, medicine and health, measurement and testing, construction and household appliances, and have a broad market. There are hundreds of optical fiber sensing technologies in, the world, and physical quantities such as temperature, pressure, flow, displacement, vibration, rotation, bending, liquid level, speed, acceleration, sound field, current, voltage, magnetic field and radiation have realized sensing of different properties.

An optical fiber sensing system can be used for measurement of ground three-component seismic signals and downhole pressure, temperature, noise, vibration, acoustic wave, seismic wave, flow, component analysis, electric field and magnetic field. The system is based on a fully armored optical cable structure, and sensors and connecting and data transmission cables are made of optical fiber. At present, there are a variety of arrangement methods for underground and downhole armored optical cables. For example, the optical cables are buried in shallow trenches below the surface, placed in a downhole control pipeline, put into a coiled tubing, directly integrated into the wall of coiled tubing made of composite materials, tied and fixed to the outside of the coiled tubing, placed in a casing, tied to the outside of the casing and permanently fixed with well fixing cement.

At present, the conventional three-component borehole geophone is most widely used in the industry to collect borehole seismic or vertical seismic profile (VSP) data. In order to record vibration signals induced by a well seismometer, circuit modules of analog signal amplification, filtering, denoising, analog-to-digital conversion, data storage and data transmission outputted by the well seismometer are also arranged in a well seismometer array, so as to transmit the borehole seismic data collected by a downhole three-component geophone array through thousands of meters of armored logging cables into an acquisition control computer on an instrument vehicle near the wellhead for storage. Due to a high temperature and high pressure operating environment in a deep well, the downhole three-component geophone array is required to work in the we stably and reliably for a long time, which brings great difficulties to the development of the downhole three-component geophone array. Electronic devices in the conventional downhole three-component geophone array are difficult to work in the high temperature environment for a long time. In addition, the borehole seismic data collected by the downhole three-component geophone array are transmitted from the well to the ground completely by armored logging cables. Due to the limitations of long-distance (thousands of meters) cable data transmission, it is impossible to transmit large amounts of downhole data to the ground at, high speed. The above factors greatly limit the development, popularization and application of the downhole three-component geophone array technology.

Traditional measurement of downhole pressure, temperature, noise and vibration signals is generally realized by downhole logging instruments or downhole electronic sensors. These electronic sensors are required to withstand high temperature, high pressure, and long-term downhole work, and these working environments and conditions are difficult challenges for conventional electronic sensors. It is impossible to arrange these electronic sensors to the outside of the casing or to measure and monitor the downhole pressure, temperature, noise, and vibration signals in a whole well section.

SUMMARY

In order to realize prediction and evaluation of sweet spots in underground shale oil and gas resources, comprehensive and accurate evaluation of reservoir hydraulic fracturing reformation effect, real-time monitoring of underground stress field and early warning of possible casing, loss, pore fluid pressure measurement of each location in the reservoir, real-time measurement of oil, gas and water flow and the change thereof (fluid producing profile) in each oil and gas producing well section, or the injection rate and the change thereof (water injection profile) in each downhole water injection or steam injection, or carbon dioxide injection or polymer injection well section and other integrated intelligent exploration and development so as to greatly reduce the exploration and development cost of shale oil and gas resources and improve the ultimate recovery, the present invention provides an intelligent geophysical data acquisition system and acquisition method for shale oil and gas optical fiber. The intelligent geophysical data acquisition system for shale oil and gas optical fiber and an integrated exploration and development engineering system are constructed by a downhole acoustic sensing optical cable arranged on the ground, an external armored optical cable buried permanently outside a downhole metal casing, an internal armored optical cable fixed outside a pipe string; a strain optical cable and a pressure sensor array arranged in the external armored optical cable, artificial seismic source excitation points arranged on the ground according to an orthogonal grid and a composite modulation and demodulation instrument arranged near a wellhead.

To achieve the above purpose, the present invention adopts the following technical solution:

An intelligent geophysical data acquisition system for shale oil and gas optical fiber is provided, comprising a metal casing; a pipe string is arranged in the metal casing, and an external armored optical cable is fixed outside the metal casing; an internal armored optical cable is fixed outside the pipe string;

The external armored optical cable comprises a downhole acoustic sensing optical cable, two multi-mode optical fibers, a strain optical cable and a pressure sensor array,
 further comprises horizontal ground acoustic sensing optical cables arranged in the shallow part of the ground according to an orthogonal grid, and artificial seismic source excitation points arranged on the ground according to the orthogonal grid;

further comprises a composite modulation and demodulation instrument placed near a wellhead; Six DAS signal ports of a composite modulation and demodulation instrument are connected with the external downhole acoustic sensing optical cable and the ground acoustic sensing optical cables respectively; two DTS signal ports of the composite modulation and demodulation instrument are connected with two downhole multi-mode optical fibers; a DSS signal input port of the composite modulation and demodulation instrument is connected with a head end of the strain optical cable; and a DPS signal input port of the composite modulation and demodulation instrument is connected with a head end of the pressure sensor array.

The pipe string is a continuous oil pipe or a continuous gas pipe;

The downhole acoustic sensing optical cable is a high-temperature resistant and high-sensitivity acoustic sensing optical cable.

The multi-mode optical fibers are high-temperature resistant and high-sensitivity multi-mode optical fibers.

The strain optical cable is a high-temperature resistant and high-sensitivity strain optical cable.

The pressure sensor array is a high-temperature resistant and high-sensitivity pressure sensor array.

The ground acoustic sensing optical cables are high-sensitivity three-component seismic elastomer acoustic sensitizing sensing optical cables.

The composite modulation and demodulation instrument is a DAS/DTS/DSS/DPS composite modulation and demodulation instrument.

Three super-flexural Rayleigh scattering enhanced sensing optical fibers are used in the external downhole acoustic sensing optical cable, which are respectively wound on a seismic elastomer to construct the downhole acoustic sensing optical cable.

The downhole acoustic sensing optical cable and the multi-mode optical fibers are encapsulated by at least one layer of continuous metal thin tube; a high-temperature resistant single-mode optical fiber in the strain optical cable is extruded by a layer of high-strength and high-temperature resistant composite material, is tightly encapsulated by at least one layer of continuous metal thin tube, and is twisted with an armored steel wire at the outermost layer of the external armored optical cable.

A tail end of the downhole acoustic sensing optical cable and a tail end of the ground acoustic sensing optical cable are provided with extinction devices respectively, and tail ends of the two multi mode optical fibers are fused together in a U shape at a bottom hole for connecting to double-ended signal input ports of two DTS signals of the composite modulation and demodulation instrument.

An optical fiber pressure sensor on the pressure sensor array is composed of any of the following pressure sensors: a diaphragm type micro F-P cavity optical fiber pressure sensor, a corrugated diaphragm type optical fiber Fabry-Perot pressure sensor, an optical fiber grating pressure sensor, and an optical fiber pressure sensor of a composite Fabry-Perot cavity; and the pressure sensors are evenly spaced at an interval of 20 to 100 meters.

The intelligent geophysical data acquisition system further comprises annular metal clips, wherein the evenly spaced annular metal clips are installed and fixed at each shoe of the metal casing to protect and fix the external armored optical cable. The internal armored optical cable is also installed and fixed outside the pipe string through the evenly spaced annular metal clips to protect and fix the internal armored optical cable.

The artificial seismic source excitation points are explosive sources or vibroseis or air gun sources or weight drop seismic sources or spark sources.

An acquisition method of the intelligent geophysical data acquisition system for shale oil and gas optical fiber comprises the following steps:

(a) synchronously and slowly placing the metal casing and the external, armored optical cable into a drilled borehole;

(b) installing the annular metal clips at a joint of two metal casings at the wellhead, and fixing and protecting the external armored optical cable to avoid rotation and movement and/or damage in the process of placing the casings;

(c) fixing the internal armored optical cable and the pipe string together at the wellhead through the annular metal clips, and protecting the internal armored optical cable from rotation and movement and/or damage in the process of placing the pipe string;

(d) pumping cement slurry from a bottom hole pump through a high-pressure pumper to return the cement slurry from the bottom hole along an annulus between the outer wall of the metal casing and a drilling hole to the wellhead; and after the cement slurry is consolidated, fixing the metal casing, the external armored optical cable and formation rock permanently together;

(e) burying horizontal ground acoustic sensing optical cables in the shallow part of the ground around the wellhead according to an orthogonal grid, and arranging artificial seismic source excitation points according to the orthogonal grid;

(f) installing extinction devices respectively at a tail end of the downhole acoustic sensing optical cable and a tail end of the ground acoustic sensing optical cable, and fusing tail ends of two downhole multi-mode optical fibers together in a U shape at a bottom hole;

(g) connecting a head end of the downhole acoustic sensing optical cable, a head end of the surface acoustic sensing optical cable and the two multi-mode optical fibers to DAS and DTS signal input ends of the composite modulation and demodulation instrument respectively at the wellhead; connecting a head end of the strain optical cable with a DSS signal input port of the composite modulation and demodulation instrument, and connecting a head end of the pressure sensor array with a DPS signal input port of the composite modulation and demodulation instrument;

(h) continuously transmitting sound source signals in the metal casing by using a built-in sound source transmitter in a downhole perforating gun, and orientating and positioning the external armored optical cable in a whole well section according to the amplitude features of the sound source signals detected by the external armored optical cable and the ground composite modulation and demodulation instrument;

(i) adjusting the orientation of a perforating charge in the perforating gun and a perforation position according to the measured position and orientation of the external armored optical cable in the whole well section, to avoid breaking the external armored optical cable during perforation through oriented perforating operation;

(j) conducting stimulation successively at the positions of the artificial seismic source excitation points arranged according to the orthogonal grid by using artificial stimulation seismic sources on the ground, and synchronously and jointly collecting, by the downhole acoustic sensing optical cable and the ground acoustic sensing optical cable, three-component seismic data in the well and the ground excited by the ground artificial seismic sources;

(k) processing the downhole three-component seismic data and the ground three-dimensional three-component seismic data collected from downhole and around the well; then obtaining three-dimensional seismic P-wave and S-wave velocity data volume by a full waveform inversion technology; and finally calibrating, adjusting and updating the three-dimensional seismic P-wave and S-wave velocity data volume obtained by full waveform, inversion by using acoustic logging velocity data and VSP velocity data, to obtain preliminary seismic P-wave and S-wave velocity fields of stratum around horizontal wells;

(l) calculating an accurate average velocity value and an interval velocity value of an underground medium according to the first-arrival travel time of the seismic data collected in the well and a distance between the artificial seismic source excitation points of the ground seismic sources and downhole detection points; conducting multiple removal processing in the ground seismic data according to the depth position of a reflector of the well seismic data, and calibrating the seismic geological reflector of each ground seismic data;

(m) processing the well seismic data and providing a stratum absorption attenuation parameter Q; establishing a well control velocity field on the ground three-dimensional seismic data collected jointly from the well and the ground and conducting amplitude recovery processing based on the velocity field according to a true amplitude recovery factor extracted from the well seismic data; and conducting deconvolution processing for the ground three-dimensional seismic data collected jointly from the well and the ground according to deconvolution parameters extracted from the well seismic data;

(n) calculating and extracting anisotropic parameters of an underground stratum based on the three-dimensional well seismic data or multi-directional Walkaway VSP or Walkaround VSP data; conducting joint modeling for velocity and anisotropic three-dimensional parameters based on VSP well drive constraint parameters; improving the resolution of the well control ground seismic data by using the well seismic data parameters; conducting anisotropic migration processing for the ground three-dimensional seismic data collected jointly from the well and the ground according to the anisotropic parameters of the underground stratum accurately calculated and extracted from the well seismic data; and conducting Q compensation or Q migration processing of pre-stack track set data for the ground three-dimensional seismic data collected jointly from the well and the ground according to the stratum absorption attenuation parameter Q extracted from the well seismic data;

(o) processing the strain data of the outer wall of the metal casing along the wellbore collected in real time by the strain optical cable, monitoring and understanding the changes of the external stress field of the downhole metal casing in real time, finding abnormal stress or strain well sections in time and preventing the casing in a stress or strain region from being extruded and damaged;

(p) conducting oriented perforating operation for the metal casing sequentially at a pre-designed downhole perforation position; at the same time, recording microseismic signals generated during oriented perforating operation by using the downhole acoustic sensing optical cable and the ground acoustic sensing optical cable which are arranged at the downhole and the composite modulation and demodulation instrument near the wellhead; calculating back the three-dimensional spatial positions of microseismic events generated during the perforating operation in combination with the preliminary P-wave and S-wave velocity distribution of the underground stratum calibrated, adjusted and updated in step (k) by using the travel time difference of the P-wave and S-wave of the perforated microseismic events or signals; if the position of the inverted perforated microseismic event is inconsistent with the perforation position, adjusting the P-wave and S-wave velocity fields in the underground stratum until the position of the inverted perforated microseismic event is within an allowable error range of the perforation position; the three-dimensional P-wave and S-wave velocity bodies after repeated adjustment are the velocity fields of the underground stratum for finally positioning microseismic events in hydraulic fracturing;

(q) conducting hydraulic fracturing microseismic monitoring jointly by using the downhole acoustic sensing optical cable and the ground acoustic sensing optical cable through the system during hydraulic fracturing operation, i.e., calculating back occurrence time, three-dimensional spatial positions and energy size of the microseismic events generated during underground stratum fracture in combination with the P-wave and S-wave velocity distribution of the underground stratum obtained in step (p) by using the travel time difference of P-wave and S-wave of the microseismic events or signals generated by underground stratum fracture in adjacent wells or same wells caused by hydraulic fracturing operation and continuously recorded by the downhole acoustic sensing optical cable, the ground acoustic sensing optical cable and the composite modulation and demodulation instrument;

(r) observing the dynamic distribution and change of the three-dimensional spatial positions of all the microseismic events that have occurred according to the occurrence time, the three-dimensional spatial positions and the energy size of the microseismic events generated during underground stratum fracture monitored in real time during hydraulic fracturing operation; and optimizing and adjusting various parameters during hydraulic fracturing operation in real time to avoid activating small faults in the stratum during hydraulic fracturing operation or to avoid flooding a reservoir by water from above and below because the pressure is too high and penetrates through the reservoir that needs to be modified;

(s) during hydraulic fracturing, monitoring downhole temperature change by using the composite modulation and demodulation instrument and the multi-mode optical fiber; reflecting the migration process and state of fracturing fluid through the change of temperature of the whole well section; analyzing and judging the amount of fracturing fluid entering the stratum and the flowback speed of the fracturing fluid by the temperature change around a perforating section; reflecting from DTS data that lower temperature represents larger fluid production or gas production;

(t) after hydraulic fracturing, conducting three-dimensional momentum inversion according to the P-wave and S-wave signal features of microseismic events generated in underground stratum fractures caused by hydraulic fracturing operation, to obtain the fracture mechanism of most microseismic events, and analyzing the distribution features and laws of tensile fractures, shear fractures and composite fractures after hydraulic fracturing reformation; calculating a total reformed volume (SRV) generated by hydraulic pressure operation by using the envelope of all the microseismic events monitored in real time in the three-dimensional spatial distribution range; conducting seismic imaging of fractures based on a focal mechanism according to the distribution features and laws of tensile fractures, shear fractures and composite fractures and the three-dimensional spatial distribution range of all the microseismic events, to generate a discrete network model of hydraulic fracturing (FMDFN); finally, based on the distribution, features and laws of the tensile fractures, the shear fractures and the composite fractures, the total reformed volume and the fracture discrete network model (FMDFN) obtained above, separating all communicated fractures from the fracture discrete network model, and estimating the volume sizes to obtain an effective reformed volume (ESRV), so as to effectively and reliably evaluate the hydraulic fracturing reformation effect of horizontal well reservoir qualitatively and quantitatively;

(u) after the horizontal well reformed by the hydraulic fracturing reservoir is put into oil and gas production, continuously measuring the noise and temperature data at each perforation point and the pore fluid pressure at each pressure sensor position on the pressure sensor array in real time by using the external armored optical cable and the connected composite modulation and demodulation instrument; calculating the flow rate of oil, gas and water and the change thereof (fluid producing profile) in each downhole oil and gas producing well section, or the injection rate and the change thereof (water injection profile) in each downhole water injection, or steam injection, or carbon dioxide injection or polymer injection well section by a multi-parameter comprehensive inversion method, to realize the long-term real-time dynamic monitoring of the development and production process of oil and gas wells and the change of well fluid production;

(v) constructing the intelligent geophysical data acquisition system for shale oil and gas optical fiber and an integrated exploration and development engineering system by using the downhole acoustic sensing optical cable arranged on the ground, the external armored optical cable, the internal armored optical cable, the artificial seismic source excitation point and the composite modulation and demodulation instrument, to realize prediction and evaluation of sweet spots in underground shale oil and gas resources, comprehensive and accurate evaluation of reservoir hydraulic fracturing reformation effect, real-time monitoring of underground stress field and early warning of possible casing loss, pore fluid pressure measurement of each location in the reservoir, real-time measurement of oil, gas and water flow and the change thereof (fluid producing profile) in each oil and gas producing well section, or the injection rate and the change thereof (water injection profile) in each downhole water injection or steam injection, or carbon dioxide injection or polymer injection well section and other integrated intelligent development, so as to greatly reduce the exploration and development cost of shale oil and gas resources and improve the ultimate recovery.

The present invention has the following technical effects.

DETAILED DESCRIPTION

For the convenience of understanding the present invention, the present invention will be described below in detail in combination with the drawings and specific embodiments. Preferred embodiments of the present invention are given in the drawings. However, the present invention may be achieved in many different forms and will not be limited to the embodiments described in the Description. On the contrary, the purpose of providing the embodiments is to understand the disclosure in the present invention more thoroughly and comprehensively. The embodiments do not constitute a limitation to the present invention and are merely examples. At the same time, the advantages of the present invention will become clearer and easier to understand by description.

Figure 1:
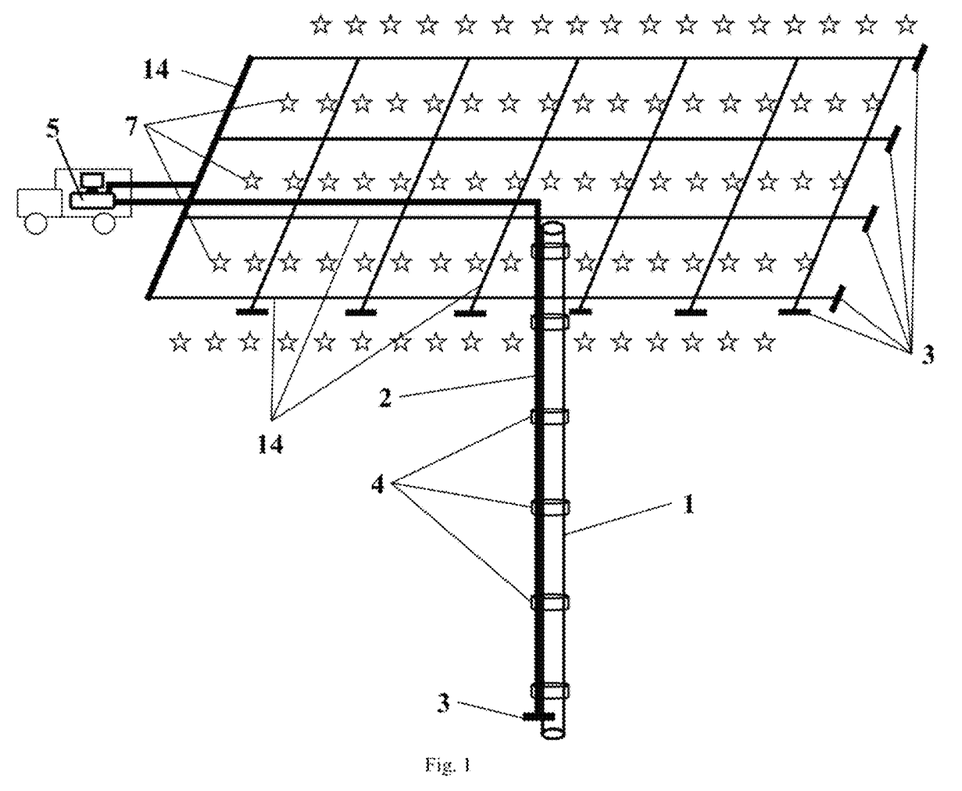
FIG. 1 is a schematic diagram of arrangement of the exterior composition of ground and metal casing and the three-dimensional joint exploration operation of wells and ground in the present invention.

FIG. 1 is a schematic diagram of arrangement of the composition of an intelligent geophysical data acquisition system for shale oil and gas optical fiber outside the ground and a metal casing 1 and the three-dimensional joint exploration operation of wells and ground in the present invention.

The intelligent geophysical data acquisition system comprises a metal casing 1; a pipe string 6 is arranged in the metal casing 1, and an external armored optical cable 2 is fixed outside the metal casing 1; the external armored optical cable 2 comprises a downhole acoustic sensing optical cable 10, two multi-mode optical fibers 11, a strain optical cable 12 and a pressure sensor array 13; an internal armored optical cable 22 is fixed outside the pipe string 6; horizontal ground acoustic sensing optical cables 14 are arranged in the shallow part of the ground according to an orthogonal grid, and artificial seismic source excitation points 7 are arranged on the ground according to the orthogonal grid; and the intelligent geophysical data acquisition system further comprises a composite modulation and demodulation instrument 5 placed near a wellhead. Three super-flexural Rayleigh scattering enhanced sensing optical fibers are used in the downhole acoustic sensing optical cable 10, which are respectively wound on a seismic elastomer to construct the downhole acoustic sensing optical cable 10.

Figure 2:
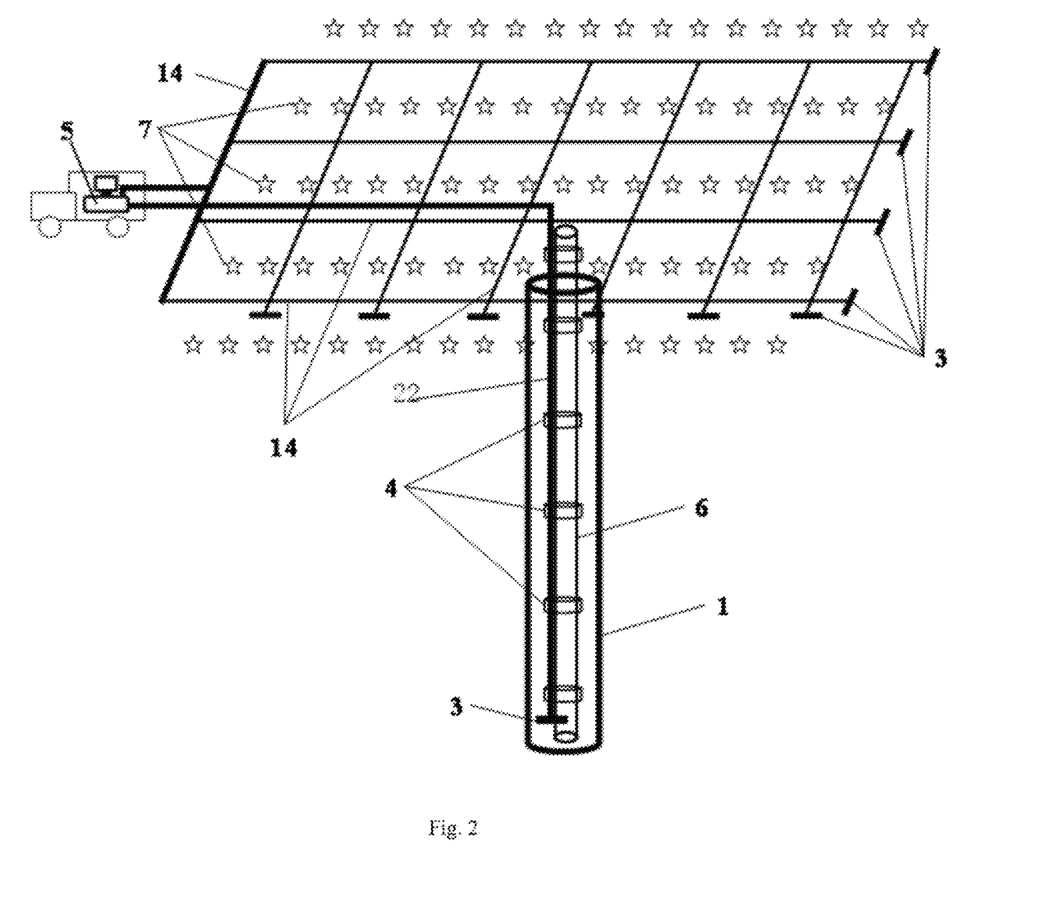
FIG. 2 is a schematic diagram of arrangement of the exterior composition of ground and pipe string and the three-dimensional joint exploration operation of wells and ground in the present invention.

FIG. 2 is a schematic diagram of arrangement of the composition of the intelligent geophysical data acquisition system for shale oil and gas optical fiber outside the ground and the pipe string and the three-dimensional joint exploration operation of wells and ground in the present invention.

Figure 3:
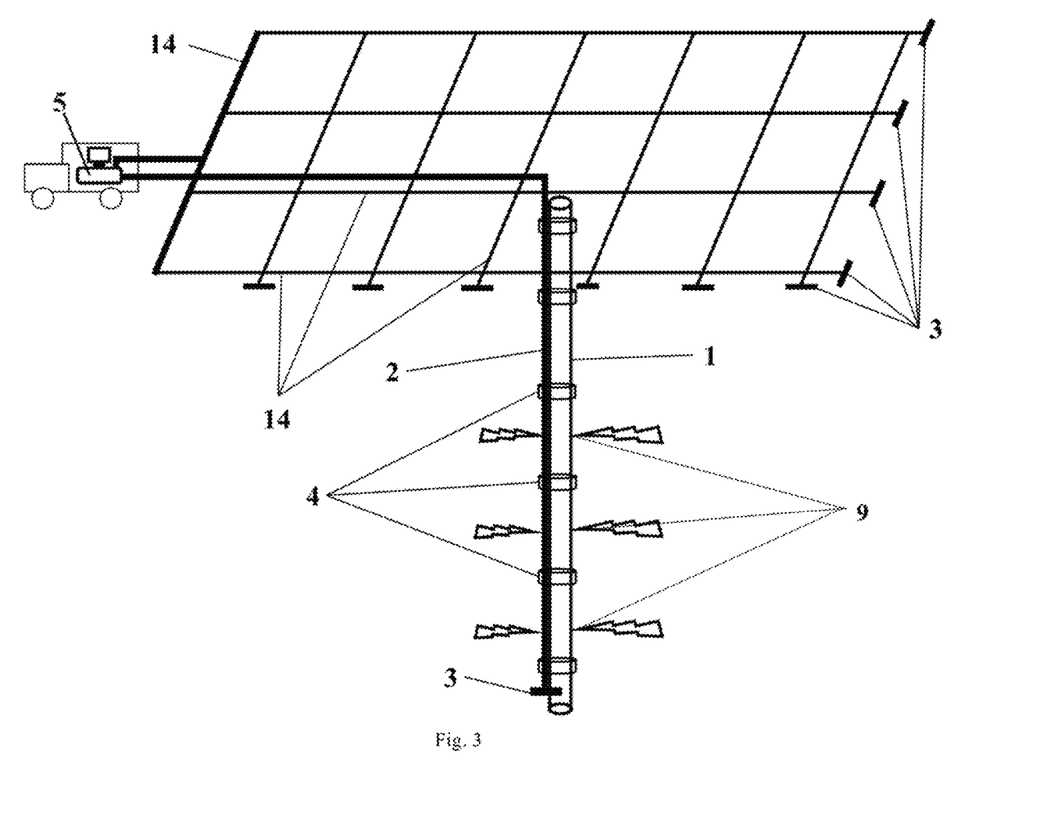
FIG. 3 is a schematic diagram for real-time monitoring and evaluation of the reservoir reformation effect of hydraulic fracturing in vertical wells in the present invention.
Figure 4:
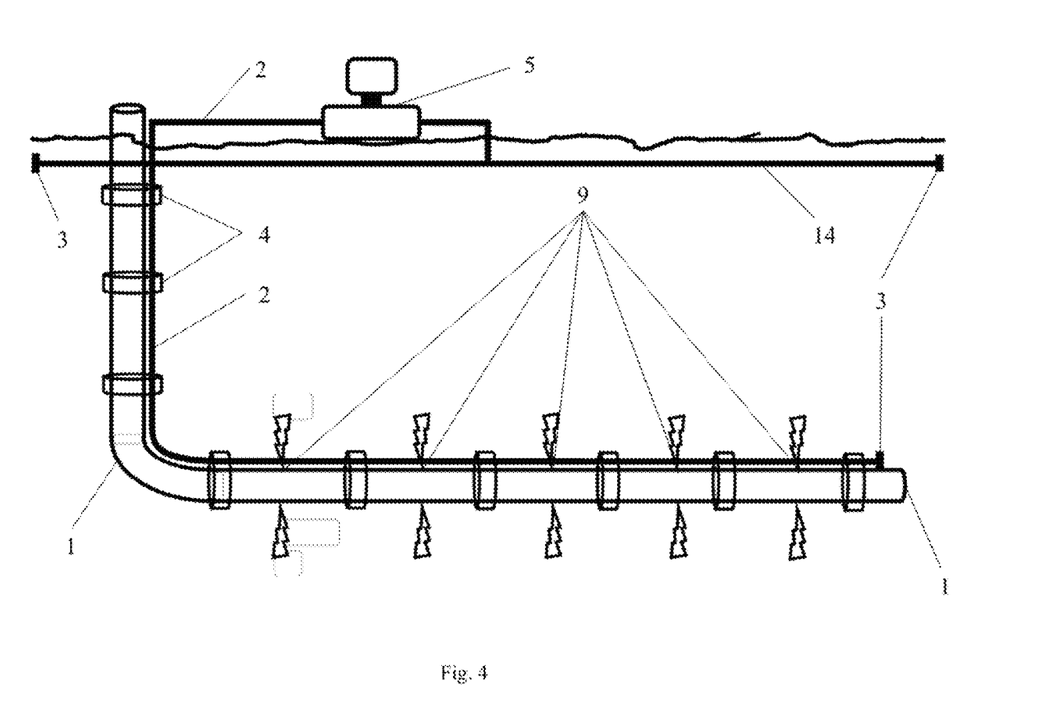
FIG. 4 is a schematic diagram for real-time monitoring and evaluation of the reservoir reformation effect of hydraulic fracturing in horizontal wells in the present invention.

FIG. 3 is a schematic diagram for real-time monitoring and evaluation of the reservoir reformation effect of hydraulic fracturing in vertical wells by the intelligent geophysical data acquisition system for shale oil and gas optical fiber in the present invention. FIG. 4 is a schematic diagram for real-time monitoring and evaluation of the reservoir reformation effect of hydraulic fracturing in horizontal wells by the intelligent geophysical data acquisition system for shale oil and gas optical fiber in the present invention. In this case, in combination with the ground, acoustic sensing optical cables 14 buried in the shallow part of the ground, microseismic monitoring of hydraulic fracturing is performed jointly for the well itself (same well monitoring) and other horizontal lateral wells (adjacent well monitoring). After the vertical or horizontal lateral well is put into oil and gas production, the noise and temperature changes of each oil and gas production well section are continuously measured in real time by using the external armored optical cable 2 to provide fluid production profile data, so as to monitor the dynamic changes of oil, gas and water production at each perforating section in real time, optimize development and production solutions and improve oil and gas recovery.

Figure 5:
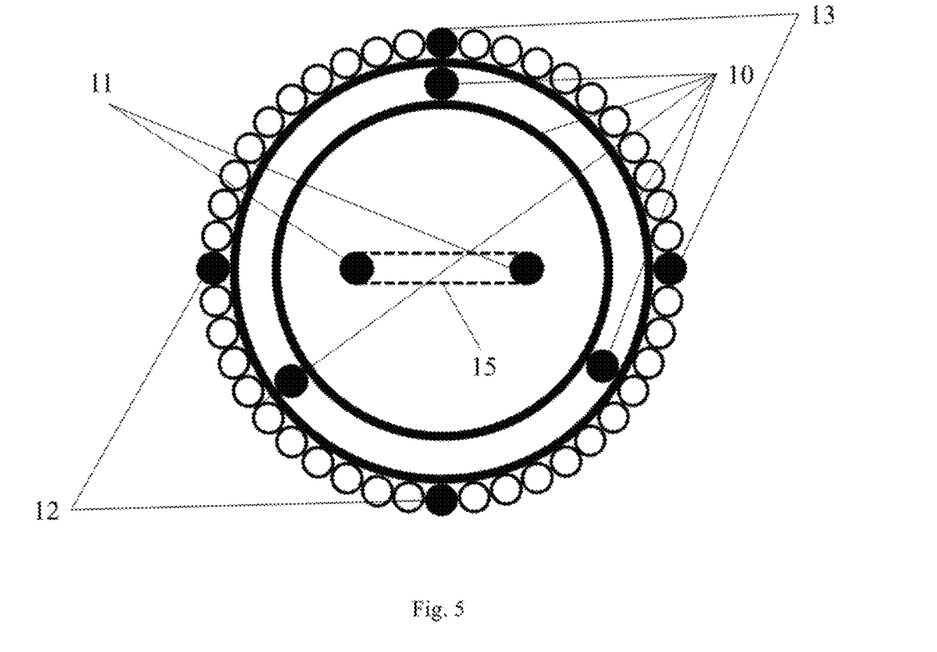
FIG. 5 is a cross-section structural schematic diagram of a downhole acoustic sensing optical cable in an embodiment.
Figure 6:
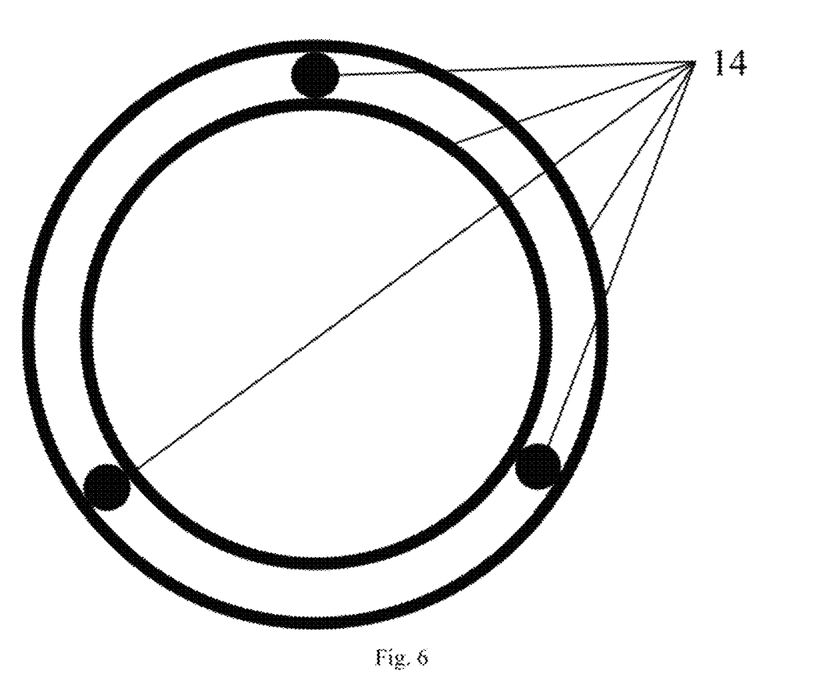
FIG. 6 is a cross-section structural schematic diagram of a ground acoustic sensing optical cable in an embodiment.

FIG. 5 is a cross-section structural schematic diagram of a downhole acoustic sensing optical cable in an embodiment. FIG. 6 is a cross-section structural schematic diagram of a ground acoustic sensing optical cable in an embodiment.

The downhole acoustic sensing optical cable 10 and the multi-mode optical fibers 11 are encapsulated by at least one layer of continuous metal thin tube; a high-temperature resistant single-mode optical fiber in the strain optical cable 12 is extruded by a layer of high-strength and high-temperature resistant composite material, is tightly encapsulated by at least one layer of continuous metal thin tube, and is twisted with an armored steel wire of the external armored optical cable of the metal sleeve 1 at the outermost layer of the armored optical cable.

A tail end of the downhole acoustic sensing optical cable 10 and a tail end of the ground acoustic sensing optical cable 14 are provided with extinction devices 3 respectively, and tail ends 15 of the two downhole multi-mode optical fibers 11 are fused together in a U shape at a bottom hole for connecting to double-ended signal input ports of two DTS signals of the composite modulation and demodulation instrument 5.

The intelligent geophysical data acquisition system for shale oil and gas optical fiber further comprises annular metal clips 4; and the evenly spaced annular metal clips 4 are installed and fixed at each shoe of the metal casing 1 to protect and fix the external armored optical cable 2 to avoid being impacted, extruded or worn and damaged in the operation of placing the casings.

An optical fiber pressure sensor on the pressure sensor array 13 may be a diaphragm type micro F-P cavity optical fiber pressure sensor or a corrugated diaphragm type optical fiber Fabry-Perot pressure sensor or an optical fiber grating pressure sensor or an optical fiber pressure sensor of a composite Fabry-Perot cavity; and the optical fiber pressure sensors are evenly spaced at an interval of 20 to 100 meters.

The internal armored optical cable 22 arranged outside the pipe string 6 is also installed and fixed outside the pipe string 6 through the evenly spaced annular metal clips 4 to protect the internal armored optical cable 22 against impact, extrusion or wear and damage in the operation of the pipe string 6.

The artificial seismic source excitation points 7 are explosive sources or vibroseis or air gun sources or weight drop seismic sources or spark sources.

An acquisition method of the intelligent geophysical data acquisition system for shale oil and gas optical fiber in the present invention comprises the following steps:

(a) synchronously and slowly placing the metal casing 1 and the external armored optical cable 2 into a drilled borehole;

(b) installing the annular metal clips 4 at a joint of two metal casings 1 at the wellhead, and fixing and protecting the external armored optical cable 2 to avoid rotation and movement and/or damage in the process of placing the casings;

(c) fixing the internal armored optical cable 22 and the pipe string 6 together at the wellhead through the annular metal clips 4, and protecting the internal armored optical cable 22 from rotation and movement and/or damage in the process of placing the pipe string 6;

(d) pumping cement slurry from a bottom hole pump through a high-pressure pumper to return the cement slurry from the bottom hole along an annulus between the outer wall of the metal casing 1 and a drilling hole to the wellhead; and after the cement slurry is consolidated, fixing the metal casing 1, the external armored optical cable 2 and formation rock permanently together;

(e) burying horizontal ground acoustic sensing optical cables 14 in the shallow part of the ground around the wellhead according to an orthogonal grid, and arranging artificial seismic source excitation points 7 according to the orthogonal grid;

(f) installing, extinction devices 3 respectively at a tail end of the downhole acoustic sensing optical cable 10 and a tail end of the ground acoustic sensing optical cable 14, and fusing tail ends 15 of two downhole multi-mode optical fibers 11 together in a U shape at a bottom hole;

(g) connecting a head end of the downhole acoustic sensing optical cable 10, a head end of the surface acoustic sensing optical cable 14 and the two multi-mode optical fibers 11 to DAS and DTS signal input ends of the composite modulation and demodulation instrument 5 respectively at the wellhead; connecting a head end of the strain optical cable 12 with a DSS signal input port of the composite modulation and demodulation instrument 5, and connecting a head end of the pressure sensor array 13 with a DPS signal input port of the composite modulation and demodulation instrument 5;

(h) continuously transmitting sound source signals in the metal casing 1 by using a built-in sound source transmitter in a downhole perforating gun, and orientating and positioning the external armored optical cable 2 in a whole well section according to the amplitude features of the sound source signals detected by the external armored optical cable 2 and the ground composite modulation and demodulation instrument 5;

(i) adjusting the orientation of a perforating charge in the perforating gun and a perforation position 9 according to the measured position and orientation of the external armored optical cable 2 in the whole well section, to avoid breaking the external armored optical cable 2 during perforation through oriented perforating operation;

(j) conducting stimulation successively at the positions of the artificial seismic source excitation points 7 arranged according to the orthogonal grid by using artificial stimulation seismic sources on the ground, and synchronously and jointly collecting, by the downhole acoustic sensing optical cable 10 and the ground acoustic sensing optical cable 14, three-component seismic data in the well and the ground excited by the ground artificial seismic sources;

(k) processing the downhole three-component seismic data and the ground three-dimensional three-component seismic data collected from downhole and around the well; then obtaining three-dimensional seismic P-wave and S-wave velocity data volume by a full waveform inversion technology; and finally calibrating, adjusting and updating the three-dimensional seismic P-wave and S-wave velocity data volume obtained by full waveform inversion by using acoustic logging velocity data and VSP velocity data, to obtain preliminary seismic P-wave and S-wave velocity fields of stratum around horizontal wells;

(l) calculating an accurate average velocity value and an interval velocity value of an underground medium according to the first-arrival travel time of the seismic data collected in the well and a distance between the artificial seismic source excitation points 7 of the ground seismic sources and downhole detection points; conducting multiple removal processing in the ground seismic data according to the depth position of a reflector of the well seismic data, and calibrating the seismic geological reflector of each ground seismic data;

(m) processing the well seismic data and providing a stratum absorption attenuation parameter Q; establishing a well control velocity field on the ground three-dimensional seismic data collected jointly from the well and the ground and conducting amplitude recovery processing based on the velocity field according to a true amplitude recovery factor extracted from the well seismic data; and conducting deconvolution processing for the ground three-dimensional seismic data collected jointly from the well and the ground according to deconvolution parameters extracted from the well seismic data;

(n) calculating and extracting, anisotropic parameters of an underground stratum based on the three-dimensional well seismic data or multi-directional Walkaway VSP or Walkaround VSP data; conducting joint modeling for velocity and anisotropic three-dimensional parameters based on VSP well drive constraint parameters; improving the resolution of the well control ground seismic data by using the well seismic data parameters; conducting anisotropic migration processing for the ground three-dimensional seismic data collected jointly from the well and the ground according to the anisotropic parameters of the underground stratum accurately calculated and extracted from the well seismic data; and conducting Q compensation or Q migration processing of pre-stack track set data for the ground three-dimensional seismic data collected jointly from the well and the ground according to the stratum absorption attenuation parameter Q extracted from the well seismic data;

(o) processing the strain data of the outer wall of the metal casing 1 along the wellbore collected in real time by the strain optical cable 12, monitoring and understanding the changes of the external stress field of the downhole metal casing 1 in real time, finding abnormal stress or strain well sections in time and preventing the casing in a stress or strain region from being extruded and damaged;

(p) conducting oriented perforating operation for the metal casing 1 sequentially at a pre-designed downhole perforation position 9; at the same time, recording microseismic signals generated during oriented perforating operation by using the downhole acoustic sensing optical cable (10) and the ground acoustic sensing optical cable 14 which are arranged at the downhole and the composite modulation and demodulation instrument 5 near the wellhead; calculating back the three-dimensional spatial positions of microseismic events generated during the perforating operation in combination with the preliminary P-wave and S-wave velocity distribution of the underground stratum calibrated, adjusted and updated in step (k) by using the travel time difference of the P-wave and S-wave of the perforated microseismic events or signals; if the position of the inverted perforated microseismic event is inconsistent with the perforation position 9, adjusting the P-wave and S-wave velocity fields in the underground stratum until the position of the inverted perforated microseismic event is within an allowable error range of the perforation position 9; the three-dimensional P-wave and S-wave velocity bodies after repeated adjustment are the velocity fields of the underground stratum for finally positioning microseismic events in hydraulic fracturing;

(q) conducting hydraulic fracturing microseismic monitoring jointly by using the downhole acoustic sensing optical cable 10 and the ground acoustic sensing optical cable 14 through the system during hydraulic fracturing operation, calculating back occurrence time, three-dimensional spatial positions and energy size of the microseismic events generated during underground stratum fracture in combination with the P-wave and S-wave velocity distribution of the underground stratum obtained, in step (p) by using the travel time difference of P-wave and S-wave of the microseismic events or signals generated by underground stratum fracture in adjacent wells or same wells caused by hydraulic fracturing operation and continuously recorded by the downhole acoustic sensing optical cable 10, the ground acoustic sensing optical cable 14 and the composite modulation and demodulation instrument 5;

(r) observing the dynamic distribution and change of the three-dimensional spatial positions of all the microseismic events that have occurred according to the occurrence time, the three-dimensional spatial positions and the energy size of the microseismic events generated during underground stratum fracture monitored in real time during hydraulic fracturing operation; and optimizing and adjusting various parameters during hydraulic fracturing operation in real time to avoid activating small faults in the stratum during hydraulic fracturing operation or to avoid flooding a reservoir by water from above and below because the pressure is too high and penetrates through the reservoir that needs to be modified;

(s) during hydraulic fracturing, monitoring downhole temperature change by using the composite modulation and demodulation instrument 5 and the multi-mode optical fiber 11; reflecting the migration process and state of fracturing fluid through the change of temperature of the whole well section; analyzing and judging the amount of fracturing fluid entering the stratum and the flowback speed of the fracturing fluid by the temperature change around a perforating section; reflecting from DTS data that lower temperature represents larger fluid production or gas production;

(t) after hydraulic fracturing, conducting three-dimensional momentum inversion according to the P-wave and S-wave signal features of microseismic events generated in underground stratum fractures caused by hydraulic fracturing operation, to obtain the fracture mechanism of most microseismic events, and analyzing the distribution features and laws of tensile fractures, shear fractures and composite fractures after hydraulic fracturing reformation: calculating a total reformed volume (SRV) generated by hydraulic pressure operation by using the envelope of all the microseismic events monitored in real time in the three-dimensional spatial distribution range; conducting seismic imaging of fractures based on a focal mechanism according to the distribution features and laws of tensile fractures, shear fractures and composite fractures and the three-dimensional spatial distribution range of all the microseismic events, to generate a discrete network model of hydraulic fracturing (FMDFN); finally, based on the distribution features and laws of the tensile fractures, the shear fractures and the composite fractures, the total reformed volume and the fracture discrete network model (FMDFN) obtained above, separating all communicated fractures from the fracture discrete network model, and estimating the volume sizes to obtain an effective reformed volume (ESRV), so as to effectively and reliably evaluate the hydraulic fracturing reformation effect of horizontal well reservoir qualitatively and quantitatively;

(u) after the horizontal well reformed by the hydraulic fracturing reservoir is put into oil and gas production, continuously measuring the noise and temperature data at each perforation point and the pore fluid pressure at each pressure sensor position on the pressure sensor array 13 in real time by using the external armored optical cable 2 and the connected composite modulation and demodulation instrument 5; calculating the flow rate of oil, gas and water and the change thereof (fluid producing profile) in each downhole oil and gas producing well section, or the injection rate and the change thereof (water injection profile) in each downhole water injection, or steam injection, or carbon dioxide injection or polymer injection well section by a multi-parameter comprehensive inversion method, to realize the long-term real-time dynamic monitoring of the development and production process of oil and gas wells and the change of well fluid production;

(v) constructing the intelligent geophysical data acquisition system for shale oil and gas optical fiber and an integrated exploration and development engineering system by using the downhole acoustic sensing optical cable 14 arranged on the ground, the external armored optical cable 2, the internal armored optical cable 22, the artificial seismic source excitation point 7 and the composite modulation and demodulation instrument 5, to realize prediction and evaluation of sweet spots in underground shale oil and gas resources, comprehensive and accurate evaluation of reservoir hydraulic fracturing reformation effect, real-time monitoring of underground stress field and early warning of possible casing loss, pore fluid pressure measurement of each location in the reservoir, real-time measurement of oil, gas and water flow and the change thereof (fluid producing profile) in each oil and gas producing well section, or the injection rate and the change thereof (water injection profile) in each downhole water injection or steam injection, or carbon dioxide injection or polymer injection well section and other integrated intelligent development, so as to greatly reduce the exploration and development cost of shale oil and gas resources and improve the ultimate recovery.

The invention claimed is:

1. An intelligent geophysical data acquisition system for shale oil and gas optical fiber, comprising a metal casing (1), wherein a pipe string (6) is arranged in the metal casing (1), and an external armored optical cable (2) is fixed outside the metal casing (1): an internal armored optical cable (22) is fixed outside the pipe string (6);

the external armored optical cable (2) comprises a downhole acoustic sensing optical cable (10), two multi-mode optical fibers (11), a strain optical cable (12) and a pressure sensor array (13);

further comprising horizontal ground acoustic sensing optical cables (14) arranged in the shallow part of the ground according to an orthogonal grid, and artificial seismic source excitation points (7) arranged on the ground according to the orthogonal grid;

further comprising a composite modulation and demodulation instrument (5) placed near a wellhead; six DAS signal ports of the composite modulation and demodulation instrument (5) are connected with the external downhole acoustic sensing optical cable (10) and the ground acoustic sensing optical cables (14) respectively; two DTS signal ports of the composite modulation and demodulation instrument (5) are connected with two downhole multi-mode optical fibers (11); a DSS signal input port of the composite modulation and demodulation instrument (5) is connected with a head end of the strain optical cable (12); and a DPS signal input port of the composite modulation and demodulation instrument (5) is connected with a head end of the pressure sensor array (13);

the pipe string (6) is a continuous oil pipe or a continuous gas pipe;

the downhole acoustic sensing optical cable (10) is a high-temperature resistant and high-sensitivity acoustic sensing optical cable;

the multi-mode optical fibers (11) are high-temperature resistant and high-sensitivity multi-mode optical fibers;

the strain optical cable (12) is a high-temperature resistant and high-sensitivity strain, optical cable;

the pressure sensor array (13) is a high-temperature resistant and high-sensitivity pressure sensor array;

the ground acoustic sensing optical cables (14) are high-sensitivity three-component seismic elastomer acoustic sensitizing sensing optical cables;

the composite modulation and demodulation instrument (5) is a DAS/DTS/DSS/DPS composite modulation and demodulation instrument.

2. The intelligent geophysical data acquisition system for shale oil and gas optical fiber according to claim 1, wherein three super-flexural Rayleigh scattering enhanced sensing optical fibers are used in the external downhole acoustic sensing optical cable (10), which are respectively wound on a seismic elastomer to construct the downhole high-sensitivity three-component seismic elastic acoustic sensitizing sensing optical cable (10).

3. The intelligent geophysical data acquisition system for shale oil and gas optical fiber according to claim 1, wherein the downhole acoustic sensing optical cable (10) and the multi-mode optical fibers (11) are encapsulated by at least one layer of continuous metal thin tube; a high-temperature resistant single-mode optical fiber in the strain optical cable (12) is extruded by a layer of high-strength and high-temperature resistant composite material, is tightly encapsulated by at least one layer of continuous metal thin tube, and is twisted with an armored steel wire at the outermost layer of the external armored optical cable (2).

4. The intelligent geophysical data acquisition system for shale oil and gas optical fiber according to claim 1, wherein a tail end of the downhole acoustic sensing optical cable (10) and a tail end of the ground acoustic sensing optical cable (14) are provided with extinction devices (3) respectively, and tail ends (15) of the two multi-mode optical fibers (11) are fused together in a U shape at a bottom hole for connecting to double-ended signal input ports of two DTS signals of the composite modulation and demodulation instrument (5).

5. The intelligent geophysical data acquisition system for shale oil and gas optical fiber according to claim 1, wherein an optical fiber pressure sensor on the pressure sensor array (13) is composed of any of the following pressure sensors: a diaphragm type micro F-P cavity optical fiber pressure sensor, a corrugated diaphragm type optical fiber Fabry-Perot pressure sensor, an optical fiber grating pressure sensor, and an optical fiber pressure sensor of a composite Fabry-Perot cavity; and the pressure sensors are evenly spaced at an interval of 20 to 100 meters.

6. The intelligent geophysical data acquisition system for shale oil and gas optical fiber according to claim 1, further comprising annular metal clips (4), wherein the evenly spaced annular metal clips (4) are installed and fixed at each shoe of the metal casing (1) to protect and fix the external armored optical cable (2).

7. The intelligent geophysical data acquisition system for shale oil and gas optical fiber according to claim 6, wherein the internal armored optical cable (22) is also installed and fixed outside the pipe string (6) through the evenly spaced annular metal clips (4) to protect and fix the internal armored optical cable (22).

8. The intelligent geophysical data acquisition system for shale oil and gas optical fiber according to claim 1, wherein the artificial seismic source excitation points (7) are explosive sources or vibroseis, or air gun sources or weight drop seismic sources or spark sources.

9. An acquisition method of the intelligent geophysical data acquisition system for shale oil, and gas optical fiber according to claim 1, comprising the following steps:
S1. synchronously and slowly placing the metal casing (1) and the external armored optical cable (2) into a drilled borehole;
S2. installing the annular metal clips (4) at a joint of two metal casings (1) at the wellhead, and fixing and protecting the external armored optical cable (2) to avoid rotation and movement and/or damage in the process of placing the casings;
S3. fixing the internal armored optical cable (22) and the pipe string (6) together at the wellhead through the annular metal clips (4), and protecting the internal armored optical cable (22) from rotation and movement and/or damage in the process of placing the pipe string (6);
S4. pumping cement slurry from a bottom hole pump through a high-pressure pumper to return the cement slurry from the bottom hole along an annulus between the outer wall of the metal casing (1) and a drilling hole to the wellhead; and after the cement slurry is consolidated, fixing the metal casing (1), the external armored optical cable (2) and formation rock permanently together;
S5. burying horizontal ground acoustic sensing optical cables (14) in the shallow part of the ground around the wellhead according to an orthogonal grid, and arranging artificial seismic source excitation points (7) according to the orthogonal grid;
S6. installing extinction devices (3) respectively at a tail end of the downhole acoustic sensing optical cable (10) and a tail end of the ground acoustic sensing optical cable (14), and, fusing tail ends (15) of two downhole multi-mode optical fibers (11) together in a U shape at a bottom hole;
S7. connecting a head end of the downhole acoustic sensing optical cable (10), a head end of the surface acoustic sensing optical cable (14) and the two multi-mode optical fibers (11) to DAS and DTS signal input ends of the composite modulation and demodulation instrument (5) respectively at the wellhead: connecting a head end of the strain optical cable (12) with a DSS signal input port of the composite modulation and demodulation instrument (5), and connecting a head end of the pressure sensor array (13) with a DPS signal input port of the composite modulation and demodulation instrument (5);
S8. continuously transmitting sound source signals in the metal casing (1) by using a built-in sound source transmitter in a downhole perforating gun, and orientating and positioning the external armored optical cable (2) in a whole well section according to the amplitude features of the sound source signals detected by the external armored optical cable (2) and the ground composite modulation and demodulation instrument (5);
S9. adjusting the orientation of a perforating charge in the perforating gun and a perforation position (9) according to the measured position and orientation of the external armored optical cable (2) in the whole well section, to avoid breaking the external armored optical cable (2) during perforation through oriented perforating operation;
S10. conducting stimulation successively at the positions of the artificial seismic source excitation points (7) arranged according to the orthogonal grid by using artificial stimulation seismic sources on the ground, and synchronously and jointly collecting, by the downhole acoustic sensing optical cable (10) and the ground acoustic sensing optical cable (14), three-component seismic data in the well and the ground excited by the ground artificial seismic sources;
S11. processing the downhole three-component seismic data and the ground three-dimensional three-component seismic data collected from downhole and around the well; then obtaining three-dimensional seismic P-wave and S-wave velocity data volume by a full waveform inversion technology; and finally calibrating, adjusting and updating the three-dimensional seismic P-wave and S-wave velocity data volume obtained by full waveform inversion by using acoustic logging velocity data and VSP velocity data, to obtain preliminary seismic P-wave and S-wave velocity fields of stratum around horizontal wells;

S12. calculating an accurate average velocity value and an interval velocity value of an underground medium according to the first-arrival travel time of the seismic data collected in the well and a distance between the artificial seismic source excitation points (7) of the ground seismic sources and downhole detection points; conducting multiple removal processing in the ground seismic data according to the depth position of a reflector of the well seismic data, and calibrating the seismic geological reflector of each ground seismic data;

S13. processing the well seismic data and providing a stratum absorption attenuation parameter Q; establishing a well control velocity field on the ground three-dimensional seismic data collected jointly from the well and the ground and conducting amplitude recovery processing based on the velocity field according to a true amplitude recovery factor extracted from the well seismic, data; and conducting deconvolution processing for the ground three-dimensional seismic data collected jointly from the well and the ground according to deconvolution parameters extracted from the well seismic data;

S14. calculating and extracting anisotropic parameters of an underground stratum based on the three-dimensional well seismic data or multi-directional Walkaway VSP or Walkaround VSP data; conducting joint modeling for velocity and anisotropic three-dimensional parameters based on VSP well drive constraint parameters; improving the resolution of the well control ground seismic data by using the well seismic data parameters; conducting anisotropic migration processing for the ground three-dimensional seismic data collected jointly from the well and the ground according to the anisotropic parameters of the underground stratum accurately calculated and extracted from the well seismic data; and conducting Q compensation or Q migration processing of pre-stack track set data for the ground three-dimensional seismic data collected jointly from the well and the ground according to the stratum absorption attenuation parameter Q extracted from the well seismic data;

S15. processing the strain data of the outer wall of the metal casing (1) along the wellbore collected in real time by the strain optical cable (12), monitoring and understanding the changes of the external stress field of the downhole metal casing (1) in real time, finding abnormal stress or strain well sections in time and preventing the easing in a stress or strain region from being extruded and damaged;

S16. conducting oriented perforating operation for the metal casing (1) sequentially at a pre-designed downhole perforation position (9); at the same time, recording, microseismic signals generated during oriented perforating operation by using the downhole acoustic sensing optical cable (10) and the ground acoustic sensing optical cable (14) which are, arranged at the downhole and the composite modulation and demodulation instrument (5) near the wellhead; calculating back the three-dimensional spatial positions of microseismic events generated during the perforating operation in combination with the preliminary P-wave and S-wave velocity distribution of the underground stratum calibrated, adjusted and updated in step (k) by using the travel time difference of the P-wave and S-wave of the perforated microseismic events or signals; if the position of the inverted perforated microseismic event is inconsistent with the perforation position (9), adjusting the P-wave and S-wave velocity fields in the underground stratum until the position of the inverted perforated microseismic event is within an allowable error range of the perforation position (9); the three-dimensional P-wave and S-wave velocity bodies after repeated adjustment are the velocity fields of the underground stratum for finally positioning microseismic events in hydraulic fracturing;

S17. conducting hydraulic fracturing microseismic monitoring jointly by using the downhole acoustic sensing optical cable (10) and the ground acoustic sensing optical cable (14) through the system during hydraulic fracturing operation, i.e., calculating back occurrence time, three-dimensional spatial positions and energy size of the microseismic events generated during underground stratum fracture in combination with the P-wave and S-wave velocity distribution of the underground stratum obtained in step (p) by using the travel time difference of P-wave and S-wave of the microseismic events or signals generated by underground stratum fracture in adjacent wells or same wells caused by hydraulic fracturing operation and continuously recorded by the downhole acoustic sensing optical cable (10), the ground acoustic sensing optical cable (14) and the composite modulation and demodulation instrument (5);

S18. observing the dynamic distribution and change of the three-dimensional spatial positions of all the microseismic events that have occurred according to the occurrence time, the three-dimensional spatial positions and the energy size of the microseismic events generated during underground stratum fracture monitored in real time during hydraulic fracturing operation; and optimizing and adjusting various parameters during hydraulic fracturing operation in real time to avoid activating small faults in the stratum during hydraulic fracturing operation or to avoid flooding a reservoir by water from above and below because the pressure is too high and penetrates through the reservoir that needs to be modified;

S19. during hydraulic fracturing, monitoring downhole temperature change by using the composite modulation and demodulation instrument (5) and the multi-mode optical fiber (11); reflecting the migration process and state of fracturing fluid through the change of temperature of the whole well section; analyzing and judging the amount of fracturing fluid entering the stratum and the flowback speed of the fracturing fluid by the temperature change around a perforating section; reflecting from DTS data that, lower temperature represents larger fluid production or gas production;

S20. after hydraulic fracturing, conducting three-dimensional momentum inversion according to the P-wave and S-wave signal features of microseismic events generated in underground stratum fractures caused by hydraulic fracturing operation, to obtain the fracture mechanism of most microseismic events, and analyzing the distribution features and laws of tensile fractures, shear fractures and composite fractures after hydraulic fracturing reformation; calculating a total reformed volume SRV generated by hydraulic pressure operation by using the envelope of all the microseismic events monitored in real time in the three-dimensional spatial distribution range; conducting seismic imaging of fractures based on a focal mechanism according to the distribution features and laws of tensile fractures, shear fractures and composite fractures and the three-dimensional spatial distribution, range of all the microseismic events, to generate a discrete network model of hydraulic fracturing (FMDFN); finally, based on the distribution features and laws of the tensile fractures, the shear fractures and the composite fractures, the total reformed volume and the fracture discrete network model (FMDFN) obtained above, separating all communicated fractures from the fracture discrete network model, and estimating the volume sizes to obtain an effective reformed volume ESRV, so as to effectively and reliably evaluate the hydraulic fracturing reformation effect of horizontal well reservoir qualitatively and quantitatively;

S21. after the horizontal well reformed by the hydraulic fracturing reservoir is put into oil and gas production, continuously measuring the noise and temperature data at each perforation point and the pore fluid pressure at each pressure sensor position on the pressure sensor array (13) in real time by using the external armored optical cable (2) and the connected composite modulation and demodulation instrument (5); calculating the flow rate of oil, gas and water and the change thereof in each downhole oil and gas producing well section, or the injection rate and the change thereof in each downhole water injection, or steam injection, or carbon dioxide injection or polymer injection well section by a multi-parameter comprehensive inversion method, to realize the long-term real-time dynamic monitoring of the development and production process of oil and gas wells and the change of well fluid production;

S22. constructing the intelligent geophysical data acquisition system for shale oil and gas optical fiber and an integrated exploration and development engineering system by using the downhole acoustic sensing optical cable (14) arranged on the ground, the external armored optical cable (2), the internal armored optical cable (22), the artificial seismic source excitation point (7) and the composite modulation and demodulation instrument (5), to realize prediction and evaluation of sweet spots in underground shale oil and gas resources, comprehensive and accurate evaluation of reservoir hydraulic fracturing reformation effect, real-time monitoring of underground stress field and early warning of possible casing loss, pore fluid pressure measurement, of each location in the reservoir, real-time measurement of oil, gas and water flow and the change thereof in each oil and gas producing well section, or the injection rate and the change thereof in each downhole water injection or steam injection, or carbon dioxide injection or polymer injection well section.

* * * * *